March 16, 1965 R. E. WHITE 3,174,042
DISTORTION-FREE HIGH VOLTAGE POWER SUPPLY
Filed March 1, 1962
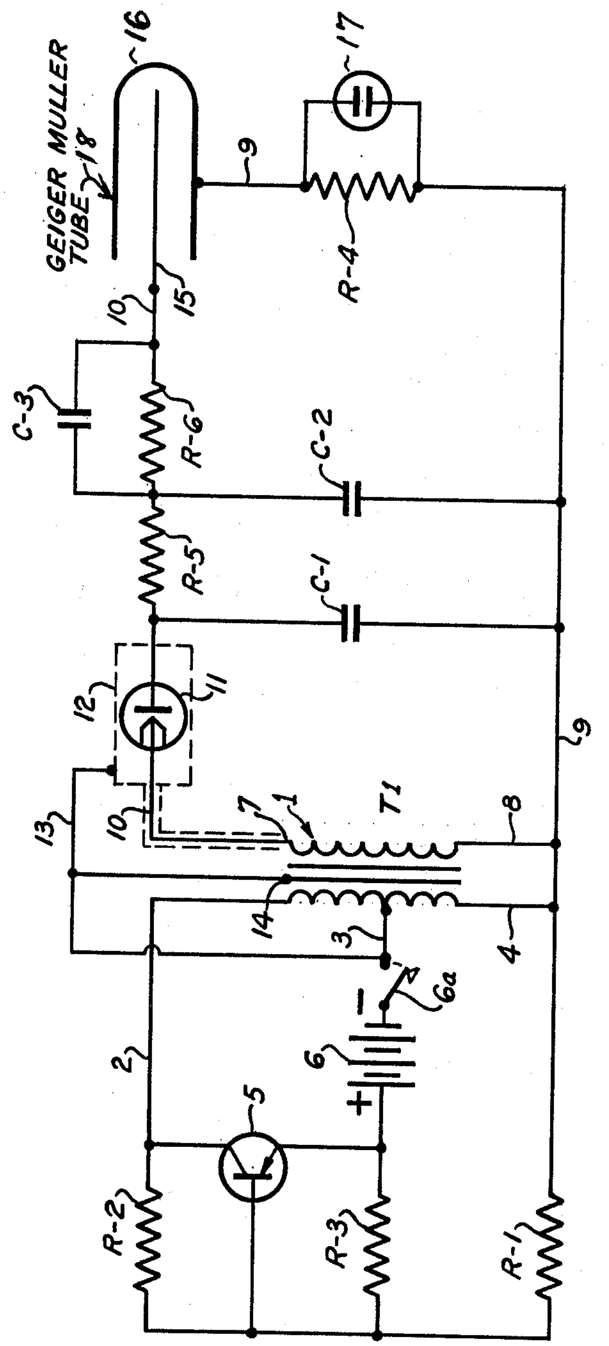
INVENTOR.
RALPH E. WHITE
BY Vandenveer Voorhees
Atty.

United States Patent Office 3,174,042
Patented Mar. 16, 1965

3,174,042
DISTORTION-FREE HIGH VOLTAGE POWER SUPPLY

Ralph Effner White, 1699 E. Mendocino St., Altadena, Calif.

Filed Mar. 1, 1962, Ser. No. 176,515
5 Claims. (Cl. 250—83.6)

This invention relates to improvements in direct current, high voltage power supplies from a rectified alternating source characterized by freedom from radio frequency emission. More particularly it relates to a combination of such power supply and to nuclear radiation counters of the Geiger-Muller (GM) type which incorporates a transistor oscillator high voltage power supply. Still more specifically, the invention relates to the suppression of RF (radio frequency) generated by the high voltage oscillator-type power supply without the use of the usual expensive components incorporated in a GM type instrument where the output signal is of the audio type.

Prior to my invention it was considered necessary and standard engineering practice to incorporate into the oscillator type high voltage power supplies commonly used for generation of high voltage (300 to 1500 volts) in nuclear radiation detection instruments of the GM type, special transformers and extensive condenser-resistor filtration for the suppression of RF from the audio signal of the instrument.

A feature of my invention is a new and novel circuit design producing an efficient and reliable method of building a GM detector using a blocking oscillator high voltage power supply made up from standard inexpensize transistor electronic components which will produce a clear and undistorted audio output signal.

Another feature of my invention is the use of this new and novel circuit in the reduction of condenser-resistor filtration network components which not only improve the reliability of the instrument but reduce the current requirements of the input to the primary of the oscillator circuit.

An object of the invention is to provide a GM nuclear radiation detector that can be readily mass produced inexpensively with a high degree of stability, long life, and very small physical size.

With this new achievement in circuit design it is now possible to produce an efficient GM gamma beta nuclear radiation detector instrument with the following desirable features:

(*a*) The use of standard transistor electronics components only of miniature or subminiature size.

(*b*) Elimination of RF (hash) from the audio signal without special electronic components.

(*c*) Reduction of input current to the primary of the power transformer by simplifying the resistance filter network on the output side of the circuit, thereby saving about 10% of the power required.

(*d*) The introduction of a subminiature or miniature transistor transformer that gives sufficient output to operate 300 to 1500 volt GM tubes.

Other objects and advantages of this invention will appear from the following specification and accompanying drawings and the novel features thereof will be particularly pointed out hereinafter.

The invention is illustrated by a drawing which is a wiring diagram of the presently preferred circuit arrangement for carrying out the invention and is to be regarded as merely illustrative.

Referring to the drawing, a miniature transistor input transformer 1 is used in reverse application as a high voltage oscillator transformer. The primary leads 2, 3, and 4 are connected to their related components which are a battery 6, suitably 3 to 9 volts, switch 6*a*, oscillator transistor 5, temperature compensating resistors R–2 and R–3, and oscillator control resistor R–1 which completes the primary section of said oscillator. The output section of said circuit operates as follows:

Lead 9, the common ground of the circuit, is connected to transformer leads 4 and 8 and returns to R–1 on the primary side. On the high voltage side, lead 9 connects C–1 and C–2 filter high voltage capacitors, suitably 0.01 mfd. capacity–1 kv., then in series to R–4 resistor and then to the cathode 16 of GM tube 18. Crystal audio output phone 17, or other detection device, is in parallel with voltage dropping resistor R–4.

The rectified high voltage side of the circuit operates as follows:

Lead 10 connects high voltage output 7 of transformer to diode rectifier 11 which delivers half wave rectified to the output circuit which connects to the plus side of C–1 filter capacitor and also with R–5 voltage dropping line resistor R–6 which is a continuation of lead 10 which is then intercepted by and connected to the plus side of C–2 filter capacitor. At this point of the circuit there is developed the required rectified and filtered high voltage potential between lead 9 common and lead 10 plus, which will deliver 300 to 1500 volts D.C. The voltage variation is selectable by varying resistor R–1. Lead 10 continues through R–6 anode load resistor paralled by C–3 peak voltage buffer condenser, suitably 0.002 mfd.–100 volts, at which point lead 10 connects to anode 15 of Geiger Muller tube 18.

Lines 9 and 10 can be connected as shown to the GM tube 18 but are not necessarily limited to this type circuit. Alternatively, they may be connected to various transistor amplifier output and voltage (glow tube) regulated circuit configurations, either audio or meter indicating or combinations thereof.

The aforesaid description of the circuit shown is employed to display and embody the RF silencing feature and configuration requirements which are the basis of this invention, to be described as follows:

Lead 10 including core and frame 14 of transformer 1 in a circuit of the aforementioned configuration generates excessive RF emission up to and including the rectifier 11 which saturates the entire area of any instrument of this type and prior to this invention required a potted (can) type transformer with a greatly multiplied condenser resistor filtration to reduce the RF noise level picked up in the audio output, either within the instrument itself or broadcasted from it.

I have now discovered that, by shielding rectifier 11 and preferably line 10 leading to it, then feeding back the RF accumulated on the shield to the primary of transformer 1, the RF emission can be cancelled out completely.

I have found that the undesirable RF emission can be suppressed in the following manner:

Referring again to the drawing, absorption shield 12 surrounding the rectifier body including lead 10 back to point 7 of the transformer picks up the RF signal and feeds it back through line 13 to transformer frame 14 at which point lead 13 carries the combined RF signal from the said lead 10, diode 11 and transformer frame 14 to the primary center tap 3 of transformer 1. The exact mechanism by which this arrangement operates to reduce RF is not fully understood, but it is believed there results a feedback of RF generated by the secondary of transformer 1 directly into the pulse signal of the primary which, due to the current strength of said primary signal, draws the weaker current RF signal back into the primary current of said transformer, thereby converting said RF signal into a lower frequency and eliminating its radiation properties.

A further advantage of this invention is the reduction of high voltage filter requirements. In general electronic theory, RF is conductable along ungrounded leads and in the case of small physical size instruments using printed circuit board techniques, metal surfaces larger than the total instrument would be required for grounding and diffusing out said RF. In my invention, an ideal combination of electrical values is established as explained in the aforesaid described circuit, which delivers to the filter network C-1, R-5, and C-2, a high voltage D.C. potential which is nearly distortion-free, and which requires a substantially lower value filter capacitor requirement. As an example, the described circuit delivering 900 volts D.C. to a conventional 900 volt GM tube uses two .01 mfd. 1 kv. volt capacitors, whereas the same circuit without the RF feedback shielding feature described in this invention would require two 0.1 mfd. 1 kv. capacitors which would not only draw excessive current to maintain the proper charge but would require a potted (can) type transformer to achieve the results described.

Having thus described my invention, what I claim is:

1. In an electrical system having a low voltage direct current supply connected to an oscillator leading to the primary of a transformer, a rectifier connected to the plus terminal of the secondary of said transformer, said rectifier producing a direct current high voltage output, a shield about said rectifier and a connection between said shield and the center tap of said transformer primary winding whereby the radio frequency produced at said rectifier is fed back into said primary winding where the low current, high frequency emission is absorbed by the high current, lower frequency primary current.

2. A nuclear radiation counter of compact size suitable for personal use comprising the following elements:

(*a*) a miniature transformer supplied at the center tap of the primary winding with electric power from a low voltage D.C. source through an oscillator producing a high frequency voltage upwards of 300 volts;

(*b*) a rectifier connected to the plus terminal of the secondary of said transformer by a conductor;

(*c*) a Geiger-Muller tube connected to the output of said rectifier through a resistor;

(*d*) an electrical discharge detector connected between the cathode of said Geiger-Muller tube and the minus terminal of said transformer secondary;

(*e*) a capacitor between said rectifier output and said minus terminal of the transformer;

(*f*) a shielding surrounding said rectifier and;

(*g*) a connection between said shielding and the center tap of said transformer primary winding whereby radio frequency radiated from said transformer is employed to produce a uniform high voltage D.C. output from said rectifier, free of RF distortion and background noise in said electrical discharge detector connected to said Geiger-Muller tube.

3. In an electrical system having a low voltage direct current supply connected to an oscillator leading to the primary of a transformer, a connection from said supply to the center tap of said primary, a connection from the plus terminal of the secondary of said transformer to a rectifier, a direct current high voltage output lead from said rectifier, an output lead from the minus terminal of said transformer secondary, a capacitor between said output leads to filter the current produced, and a shield about said rectifier connected to the center tap of said primary winding whereby radio frequency emission from said rectifier is fed back, thereby conserving electrical energy in the system and permitting use of a smaller capacitor between said output leads.

4. The system of claim 3 wherein the said shield is also connected to the frame of said transformer.

5. The system of claim 1 wherein the said shield is also connected to the frame of said transformer.

References Cited by the Examiner

UNITED STATES PATENTS

| | | | |
|---|---|---|---|
| 2,764,696 | 9/56 | Hepp | 250—83.6 |
| 2,995,661 | 8/61 | White | 313—93 X |

RALPH G. NILSON, *Primary Examiner.*